United States Patent
Brennan (10) Patent No.: US 6,928,881 B2
(45) Date of Patent: Aug. 16, 2005

(54) METHOD AND APPARATUS FOR MONITORING STRUCTURAL FATIGUE AND USE

(75) Inventor: Feargal Peter Brennan, London (GB)

(73) Assignee: University College London, London (GB)

( * ) Notice: Subject to any disclaimer, the term of this patent is extended or adjusted under 35 U.S.C. 154(b) by 0 days.

(21) Appl. No.: 10/312,927

(22) PCT Filed: Jun. 29, 2001

(86) PCT No.: PCT/GB01/02944

§ 371 (c)(1),
(2), (4) Date: Dec. 27, 2002

(87) PCT Pub. No.: WO02/01172

PCT Pub. Date: Jan. 3, 2002

(65) Prior Publication Data

US 2004/0025595 A1 Feb. 12, 2004

(30) Foreign Application Priority Data

Jun. 29, 2000 (GB) .......................... 00160246

(51) Int. Cl.⁷ .............................. G01B 7/16
(52) U.S. Cl. ......................... 73/766; 73/786
(58) Field of Search .................. 73/766, 768, 774, 73/781, 784, 786, 787

(56) References Cited

U.S. PATENT DOCUMENTS

| | | | |
|---|---|---|---|
| 4,093,954 A | | 6/1978 | Prewitt, Jr. et al. |
| 4,179,940 A | | 12/1979 | Oertle et al. |
| 4,336,595 A | | 6/1982 | Adams et al. |
| 4,745,564 A | * | 5/1988 | Tennes et al. .............. 702/141 |
| 4,756,194 A | | 7/1988 | Grandpierre et al. |
| 4,882,937 A | | 11/1989 | Leon |
| 5,427,516 A | * | 6/1995 | Bader et al. ................ 425/149 |
| 5,467,656 A | | 11/1995 | Teare et al. |
| 5,471,885 A | * | 12/1995 | Wagner ................ 73/862.041 |
| 5,509,374 A | | 4/1996 | Trout |
| 5,528,935 A | | 6/1996 | Welch et al. |
| 5,531,122 A | | 7/1996 | Chatham et al. |
| 5,548,999 A | * | 8/1996 | Kakizaki et al. ............. 73/493 |
| 5,959,214 A | * | 9/1999 | Vaidyanthan et al. ......... 73/777 |
| 6,076,405 A | | 6/2000 | Schoess |
| 6,216,542 B1 | * | 4/2001 | Stockli et al. ................ 73/774 |

FOREIGN PATENT DOCUMENTS

| | | |
|---|---|---|
| EP | 0 856 817 A1 | 8/1998 |
| GB | 2 020 432 A | 11/1979 |
| GB | 2 032 119 A | 4/1980 |
| GB | 2 158 242 A | 11/1985 |
| GB | 2 196 740 A | 5/1988 |
| GB | 2 234 353 A | 1/1991 |
| GB | 2 281 625 A | 3/1995 |

* cited by examiner

Primary Examiner—Max Noor
(74) Attorney, Agent, or Firm—Blakely, Sokoloff, Taylor & Zafman; Stephen M. De Klerk (57) ABSTRACT

An electronic stress monitoring device (1) is provided that is arranged to detect and record measurements of stress experienced by a structure (2) to which the stress history unit is attached, with the measurement and recordal of stress occurring at substantially the same location. The stress monitoring unit (1) is also arranged to process the detected readings of stress to determine when significant structural events are occurring within the structure (2) to which it is attached. Data indicative of these events are recorded within the stress monitoring device (1). Periodically data recorded within the stress monitoring device (1) is obtained by data reader (4) and then transmitted to a computer (6) for subsequent analysis.

12 Claims, 9 Drawing Sheets

METHOD AND APPARATUS FOR MONITORING STRUCTURAL FATIGUE AND USE

CROSS-REFERENCE TO OTHER APPLICATION

This Application is a National Phase of International Application No. PCT/GB01/02944, file Jun. 29, 2001, which claim priority from Great Britain Patent Application No. 00160246.7, filed on Jun. 29, 2000.

The present application relates to method and apparatus for measuring structural fatigue to generate an electronic record of stress and strain experienced by a structure. Embodiments of the present invention concern apparatus which monitor and record structurally significant events so that the structural integrity of components may be determined.

Engineering components rarely fail by a single application of load. Normally bulk static material resistance to applied load is reasonably well understood and components are designed to contain design loads. In addition, most designs incorporate safety factors to account for unforeseen events including underestimation of the magnitude of applied load and overestimation of material strength. The vast majority of engineering components therefore fail by a combination of progressive failure mechanisms which affect a structural material's ability to elastically resist applied stresses. In the great majority of cases involving progressive degradation of structural materials the term fatigue is frequently used.

Fatigue may be defined as structural deterioration of a material under varying load which never reaches a magnitude that would cause failure in a single application. It is a progressive phenomenon, the time taken to reach the fatigue failure state is directly related to the magnitude and number of local stress/strain oscillations and structurally significant events. There are many different mechanisms attributed to fatigue but all have some relationship to the nature of applied load.

There is general acceptance that the fatigue process consists of two distinct phases. The first is fatigue crack initiation. This is the period during which a material is cyclically stressed and reacts as an apparent continuum i.e. There is no macroscopic evidence that stressing is causing damage to the uniformity of the material. However, in reality it is known that if the stress/strain cycles are above a threshold magnitude, micro-mechanisms contribute to the generation of macroscopic discontinuities in the material's fabric, these frequently grow to become fatigue cracks.

The second phase of the fatigue process is fatigue crack propagation. This is the period during which cracks grow in size at varying rates depending upon the nature of the loading, the material through which the crack grows and the environment in which the crack is exposed. Finally when the crack reaches a critical size, the component will fail in a relatively short period of time.

Structural integrity management is an extension of quality assurance applied to structures during their effective lives. The underlying check against which a structure is judged is whether it is fit-for purpose i.e. although a certain degree of damage and/or increased loads may be tolerated a structure must be continually or periodically evaluated for its ability to safely conduct the task for which it was designed.

Fatigue crack propagation is relatively easy to monitor (hence the large number of commercial crack inspection instruments available) due to the macroscopic nature of cracks. Once a crack/flaw is detected it can be measured relatively accurately and linear elastic fracture mechanics analysis applied to understand the time until the crack develops to a critical size. This is determined using general yielding and fracture analysis.

In contrast, there is no instrument available that can directly measure the damage fraction spent during the fatigue crack initiation phase. Instead, industry relies on periodic inspection for cracks based upon analytical and numerical prediction models. These, like all simulations are sensitive to the skill and experience of integrity assessment engineers and subsequent discovery of cracks is dependent upon the skill of the inspector and performance of the inspection method.

The lack of a fatigue crack initiation monitor is a real disadvantage for integrity assessment, particularly when one considers that in certain highly finished structural components (e.g. shafts, spindles, bearing housings, rotor blades etc.) total fatigue life can often comprise of up to 90% fatigue crack initiation and 10% fatigue crack propagation.

It is known in the case of aircraft bodies to provide electrical strain gauges to measure variations in strain experienced by the aircraft. The signals generated by a number of strain gauges at various positions on an aircraft are then fed to a central recording device where the signals are digitised and representation of the signals are recorded on magnetic tape. In U.S. Pat. No. 4,336,595, it was recognised that the delay which arose between obtaining strain data and its subsequent interpretation was undesirable, and therefore it was proposed that detected signals should be automatically processed within a computer on board the aircraft rather than merely recorded.

A further example of a built in monitoring system is disclosed in U.S. Pat. No. 5,531,122. This discloses a monitoring system for trucks in which the pressure within oil suspension struts in shock absorbers are monitored. However, although U.S. Pat. No. 4,336,595 and U.S. Pat. No. 5,531,122 are examples of monitoring system neither the system of U.S. Pat. No. 4,336,595 nor that described in U.S. Pat. No. 5,531,122 is suitable for use for monitoring a variety of different structures.

An example of a device for automatically processing stress measurements is disclosed in EP0856817. This discloses a device which can be connected to external strain gauges via strain gauge ports. Readings from the external strain gauges are then automatically processed utilizing rain flow analysis to obtain a set of values indicative of fatigue.

In accordance with one aspect of the present invention there is provided apparatus for detecting and recording strain experienced by a structure to which the apparatus is attached, said apparatus comprising:

a housing open at one end;

a strain gauge arranged to be fixed to and measure the strain experienced by a structure to which the apparatus is attached;

electronic data storage means for storing measurements of strain by said strain gauge; and wiring means for transferring measurements of strain from said strain gauge to said data storage means, characterised in that said strain gauge, said wiring means and said electronic data storage means are all contained within said housing.

In accordance with this aspect of the present invention a device is provided which comprises not only an in situ strain detector but also a means located substantially at the same position as the strain detector for recording/storing date therefrom. This means highly faithful recordings of the signals can be made for future analysis. By minimising the distance and length of the wiring between the strain detection device and the data storage device it is possible to reduce signal degradation by eliminating temperature, electrical electromagnetic interference from the transmission of a signal between the strain gauge and the data storage system. By eliminating the sources of error an improved record of the strains experienced by a structure may be obtained.

In accordance with a further aspect of the present invention there is provided a device for recording the strain exerted upon a structure to which the apparatus is attached, said apparatus comprising:

a housing open at one end;

strain detection means mounted within said housing for detecting strain exerted upon the structure to which the apparatus is attached; and data storage means mounted within said housing said data storage means being arranged to store data indicative of the strains detected by said strain detection means;

characterised by further comprising determination means for determining from said strains detected by said strain detection means and data stored in said data storage means when a significant structural event is occurring, wherein said data storing means is arranged to record data indicative of significant structural events as determined by said determining means.

The applicants have appreciated that whilst laboratory equipment exists for measuring stress experienced by structures, such laboratory equipment is aimed primarily at obtaining highly accurate measurements of stress and strain. Such great accuracy is, however, not necessary in determining the long term effects of stress upon the structural integrity of components since much of the data is superfluous and highly accurate readings of stress are not required. Thus in accordance with this aspect of the present invention means is provided to determine from measured stress readings the degree of structural use of a component. This is achieved by determining whether a significant structural event is occurring and recording data only when such events occur. In this way a record of stresses resulting in cyclic hardening and softening, loading interaction effects with variable amplitude cycling, coaxing and rest periods etc for an individual structure may be determined. The amount of usage of a component can therefore be measured.

The applicants have further appreciated that by providing an apparatus to read and record stresses throughout the entire lifetime of a component or structure a means is provided by which fatigue within the device or structure may be monitored, in particular during the crack initiation phase. In order to measure and record stresses over the entire lifetime of a structure, a power source which provides sufficient power for monitoring and recording for the entire lifetime of the structure must also be provided. This can be achieved by either providing a renewable power source e.g. a solar panel, or alternatively arranging the measuring means and recording means in a manner which minimises power consumption so that a non-renewable power source, such as a battery may power the apparatus for substantially the lifetime of the structure being monitored.

Figure 1:
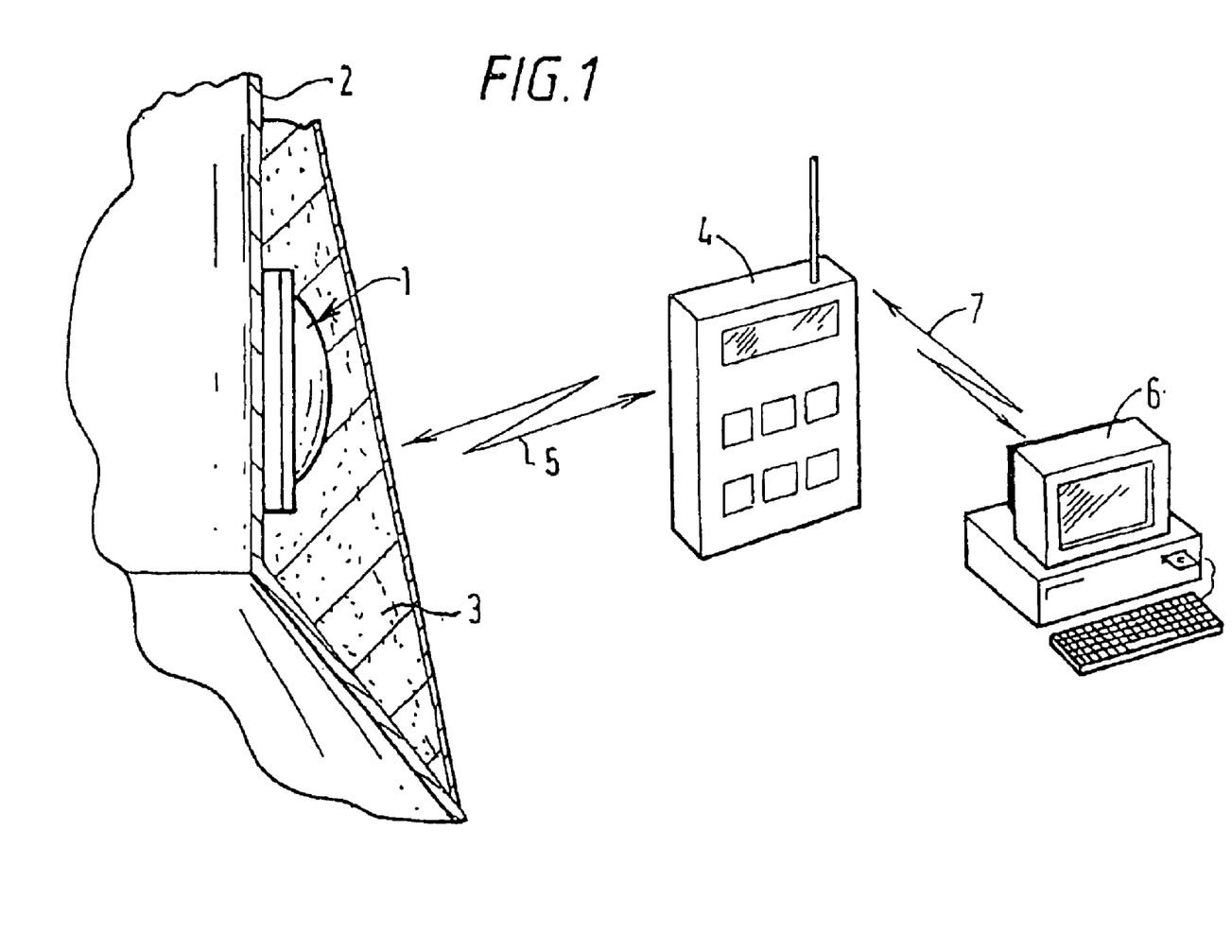
FIG. 1 is a schematic diagram of a first embodiment of the present invention.

Further aspects and embodiments of the present invention will become apparent with reference to the following description and drawings in which:

FIG. 1 is a schematic diagram of a first embodiment of the present invention. A stress monitoring device 1 in accordance with this embodiment of the present invention is arranged to monitor stresses and strains exerted upon a drill string 2 used to rotate a drill bit (not shown in FIG. 1) for cutting through rock as part of oil and gas drilling equipment.

In accordance with this embodiment of the present invention the stress monitoring device 1 is attached to the surface of the drill string 2 whose stresses are to be monitored. The drill string 2 and the stress monitoring device 1 are then covered by hard facing 3 which acts to protect the stress monitoring device 1 from damage whilst the drill string 2 is being used.

Once in place the stress monitoring device 1 continually monitors and records the stresses and strains exerted upon the drill string 2. Data indicative of significant structural events detected by the stress monitoring device are recorded within the memory (not shown in FIG. 1) of the stress monitoring device 1.

Periodically, when the drill string is returned to the surface the stress monitoring device 1 is interrogated by a data reader 4 that is arranged to download data from within the memory of the stress monitoring device 1 into the data reader 4 by means of a radio link 5. Thus in this way data recorded by the stress monitoring device 1 may be accessed without either removing the stress monitoring device 1 from the drill string 2 or removing the hard facing 3 protecting the stress monitoring device 1.

When data from the memory of the stress monitoring device 1 has been copied into the data reader 4, this data may further be transferred to a computer 6 from the data reader 4 by a second radio link 7 where the data recorded by the stress monitoring device 1 can be subjected to further analysis.

By providing a stress monitoring device 1 that is arranged for continually monitoring the stresses experienced by the drill string 2 a means is provided to enable the monitoring of fatigue crack initiation. In particular, in accordance with this embodiment of the present invention where a stress monitoring device 1 is provided to monitor stresses on a drill string 2 used under ground, by providing a memory which stores a record of stresses, a means is provided to obtain a record of stress throughout the user of the drill string 2 even though data may only be periodically obtained by the data reader 4 due to difficulties of communicating with the stress monitoring device 1 when the drill string is under ground. By withdrawing drill strings from use on the basis of monitored stresses down hole failure of a drill string during a drilling operation can therefore be avoided.

Figure 2:
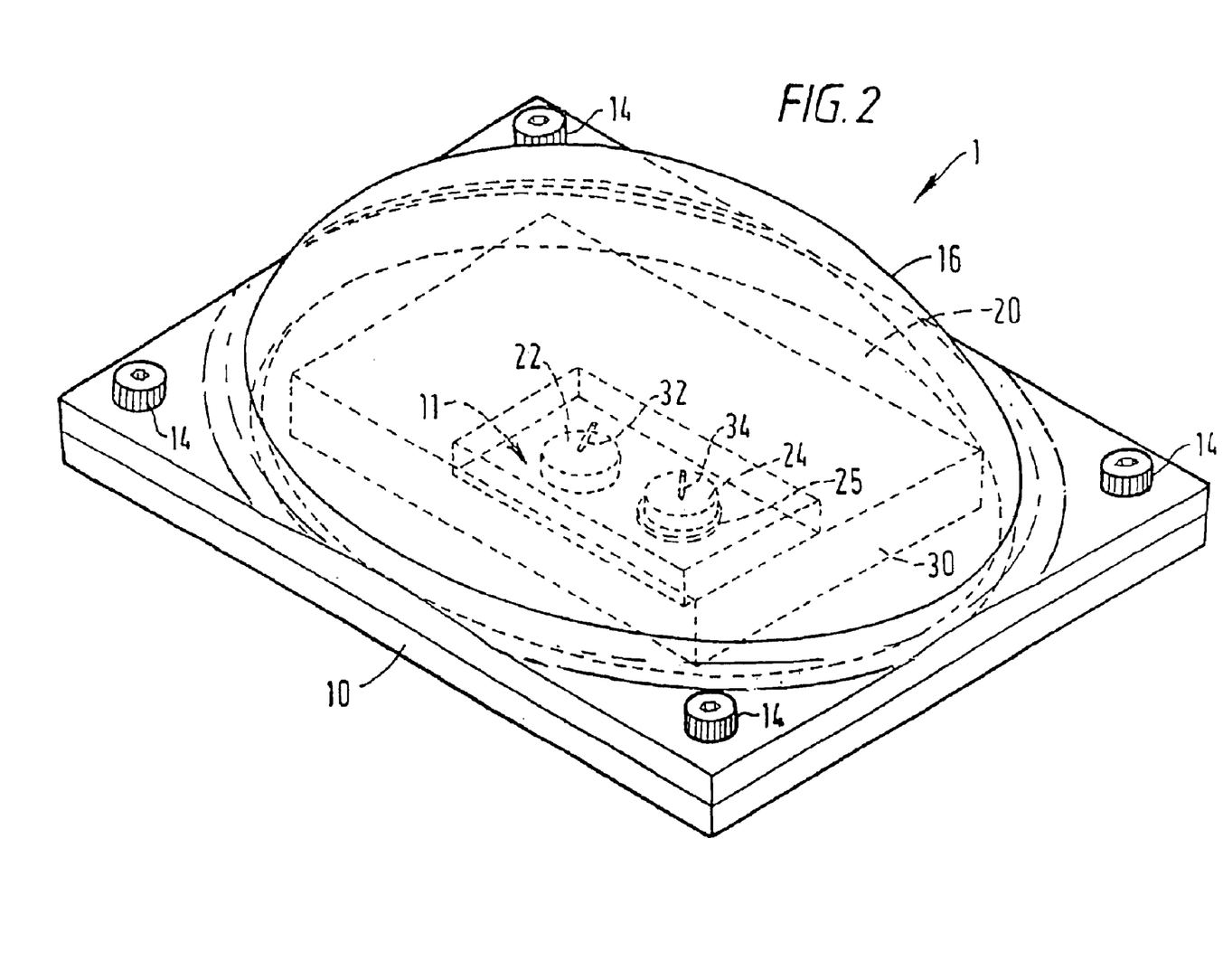
FIG. 2 is a perspective view of a stress monitoring device in accordance with a first embodiment of the present invention.
Figure 3:
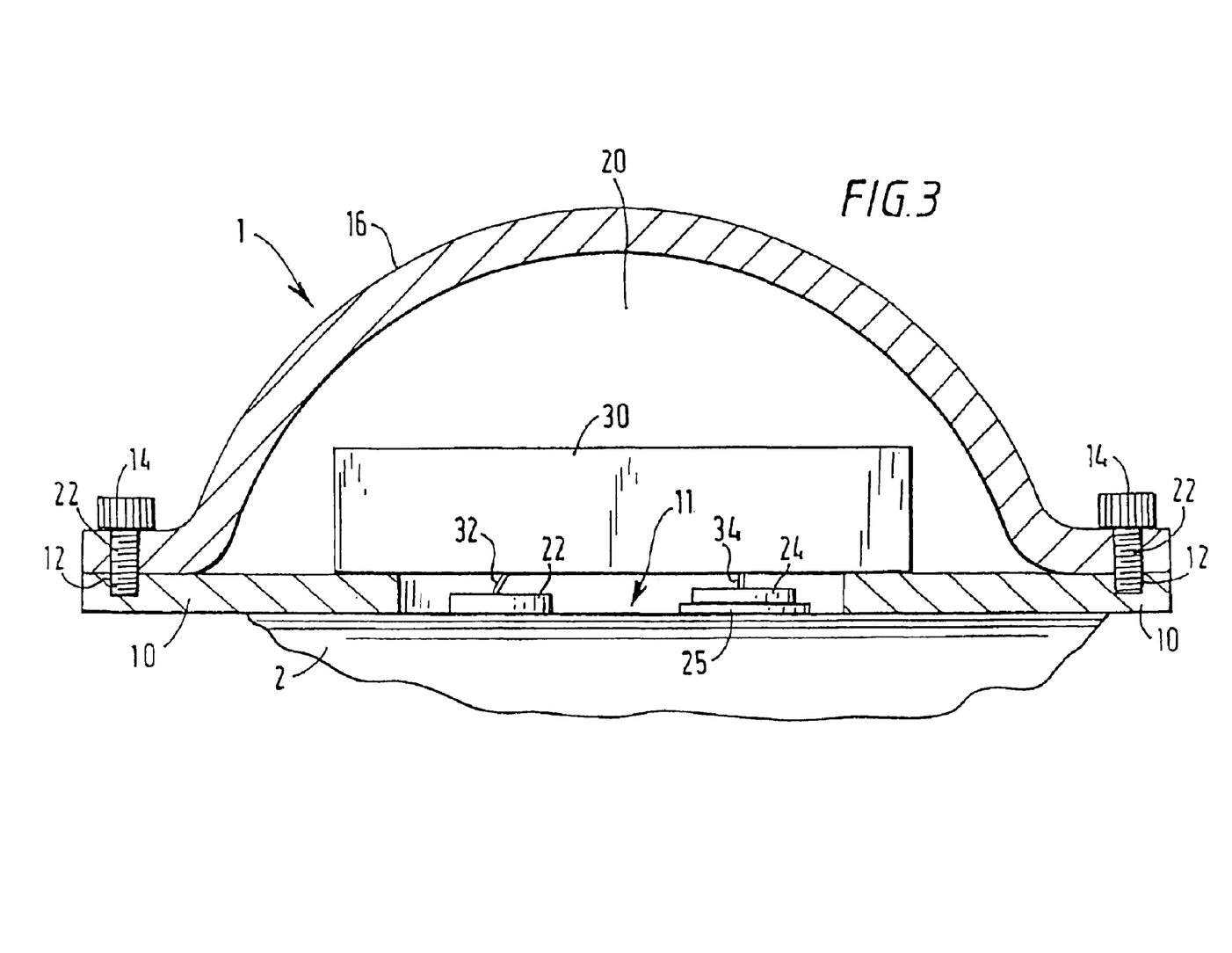
FIG. 3 is a cross-section of a stress monitoring device in accordance with a first embodiment of the present invention.

The physical structure of a stress monitoring device 1 in accordance with this embodiment of the present invention will now be described with reference to FIGS. 2 and 3 in which FIG. 2 is a schematic perspective view of a stress monitoring device in accordance with this embodiment of the present invention and FIG. 3 is a cross-section of a stress monitoring device 1.

In accordance with this embodiment of the present invention the stress monitoring device 1 comprises a 60×80 mm rectangular plate 10 that has a 10×20 mm rectangular hole 11 at its centre. In this embodiment the rectangular plate comprises 15 mm thick brass plate. It will be appreciated however that in other embodiments any suitable material for example plastic, aluminium etc which is relatively strong and can be shaped could be used. This rectangular plate 10 is bonded by epoxy-resin to the surface of the drill string 2. At the four corners of the rectangular plate 10 are provided screw holes 12 arranged to receive screws 14 for fixing a cover 16 to the rectangular plate 10.

In this embodiment the cover 16 comprises a 60×80 mm rectangular cover made from rigid plastic and has provided in its surface a dome of a half ovoid shape that rises to a distance of 24 mm from the upper surface of the rectangular plate 10 at its centre thereby defining a cavity 20 between the dome of the cover 16 and the upper surface of the rectangular plate 10. The four corners of the cover 16 not occupied by the dome extend to form flanges which each have provided therein a further screw hole 22 through which the screws 14 pass to fix the position of the cover 16 relative to the plate 10. By bonding the rectangular plate 10 to the surface of a drill string 2 and then bolting the cover 16 to the plate 10 by means of inserting screws 14 through the screw holes 12,22 a means is provided to fix the cover 16 to the drill string 2 without drilling holes into the drill string 2 itself and thus affecting the structural integrity of the drill string 2.

Provided within the hole 11 of the rectangular plate 10 are a first 22 and a second 24 electronic strain gauge comprising conventional electronic rosette strain gauges each arranged to measure strain in three directions on the basis of change in resistance arising due to stretching of wires within the rosettes. The first strain gauge 22 is bonded to the surface of the drill string 2 so that the electrical resistance of the first strain gauge 22 varies in accordance with stresses and strains exerted upon the drill string 2. The second strain gauge 24, in this embodiment of the present invention, is arranged to measure environmental changes such as changes in temperature which result in variation in readings from both the strain gauges 22,24. The second strain gauge 24 is therefore not fixed to the surface of a load bearing structure but is instead fixed to a non load bearing foil 25 of material corresponding to the material from which the drill string 2 is made. Thus in this way, variations in electrical resistance arising solely from environmental factors other than exerted stress can be determined as the foil 25 will expand and contract in a similar manner to the material of the drill string 2. By subtracting the variations in readings of strain by the second strain gauge 24 from the readings of the first strain gauge 22 a record of the stresses and strains experienced by the drill string 2 solely by virtue of applied loads can be obtained. The provision of a second strain sensor 24 as a dummy gauge enables the variation in resistance arising from environmental factors to be determined without the need for significant processing power and therefore requires relatively small amounts of electrical power to be achieved.

Both the first 22 and second 24 strain gauges are attached to a processing unit 30 provided within the cavity 20 defined by the dome of the cover 16 and the upper surface of the rectangular plate 10 by means of wires 32,34. In this embodiment, these wires 32,34 extend a distance of approximately 20 mm from the strain gauges 22,24 to the processing unit 30.

The provision of a processing unit 30 within a housing defined by the cover 16 and the rectangular plate 10 also provides means by which data obtained from the strain gauges 22,24 may be recorded substantially in situ. This enables the stress monitoring device 1 to be deployed to measure strains experience by structures such as the drill string 2 which rotate or move since no significant relative movement of the processing unit 30 relative to the strain gauges 22,24 will arise.

The wires, 32, 34 are arranged to transfer current from the strain gauges 22,24 to the processing unit 30. For each of the strain gauges 22,24 the small variations in resistance in each of the three circuits comprising wiring arranged perpendicular to the three directions in which stress is to be monitored can then be determined from variations in current in the circuits. The circuits in which current is measured comprise the measuring wiring of the strain gauges 22,24 and the wires 32,34 connecting the strain gauges 22,24 to the processing unit 30. The resistance in these circuits varies in the case of the wires of the first strain gauge 22 due to environment factors such as changes in temperature and due to stretching due to the application of load to the drill string 2. In the case of the second strain gauge 24, since this is not bonded to a load bearing surface, the variation in resistance in the wires of the second strain gauge 24 is due to environment factors alone. These measurements of resistance can then be converted into measurements of strain experienced by the drill string 2 as will be described in detail later.

The applicants have appreciated that as the variation in resistance used to determine measurements of strain are small, variation in the resistance of the wiring 32,34 connecting strain gauges 22,24 to a processing unit 30 can be a significant cause of error in readings of strain obtained from a strain gauge. In particular, as the measurement of strain by an electrical strain gauge 22,24 causes only very small changes in resistance in the strain gauges 22,24 for example changes of approximately 20 mΩ in a 120Ω resistance strain gauge, comparable changes in resistance can also be generated as a result of thermal expansion or vibration of the wiring 32,34 connecting the strain gauge 22,24 to a processing unit. Thus in order to minimise these errors these lengths of wires 32,34 connecting the strain gauges 22,24 to the processing unit 30 are made as short as possible to minimise the errors prior to signals generated by the strain gauges 22,24 being amplified by processing unit 30. Furthermore, these wires 32,34 are contained within the cavity 20 defined by the dome of the cover 16 and therefore to a certain extent shielded from variations in external environment by the cover 16 and hard facing 3.

Figure 4:
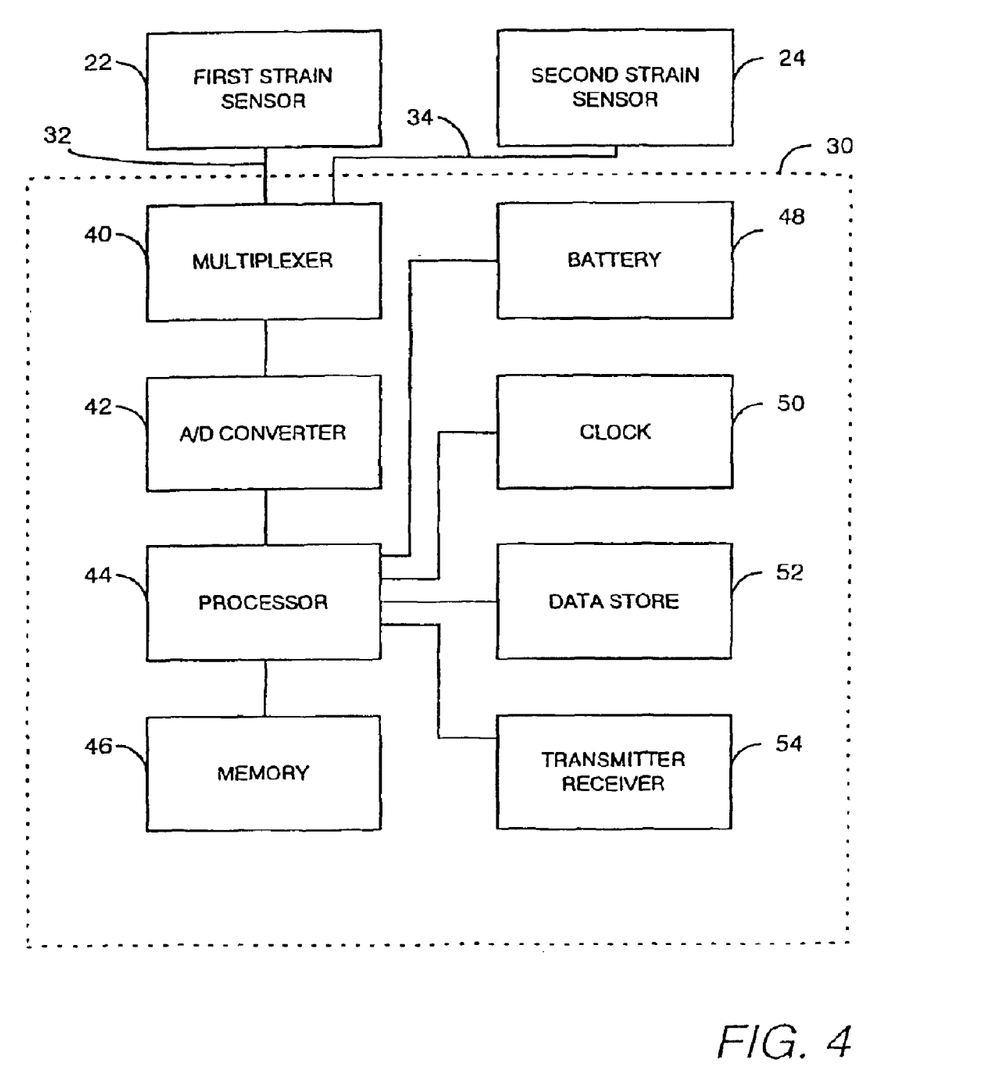
FIG. 4 is a block diagram of the processing unit of FIG. 3.

FIG. 4 is a block diagram of the processing unit 30 connected to the first strain sensor 22 and the second strain sensor 24 by the short lengths of wires 32 and 34 respectively.

In this embodiment of the present invention the processing unit 30 comprises a multiplexer 40 that is connected to the wires 32 and 34 connected to the first 22 and second 24 strain sensors. The processing unit 30 also comprises an analogue/digital converter 42 connected to the multiplexer 40, a processor 44, a memory 46, a battery 48, a clock 50, a temporary data store 52 and a receiver/transmitter 54.

The processor 44 in addition to being connected to the analogue/digital converter 42 is also connected to the memory 46, the battery 48 for powering the processing unit 30, the clock 50, the temporary data store 52 and the receiver transmitter 54.

The multiplexer 40 is arranged to receive signals from the first strain sensor 22 and the second strain sensor 24 simultaneously. The multiplexer 40 converts the simultaneous readings received from the first 22 and second 24 strain sensors into six separate signals being measurements of current in each of the three circuits of both of the strain sensors 22,24 which are then passed to an analogue digital converter 42 connected to the multiplexer. The analogue digital converter 42 converts the analogue signals output by the multiplexer 40 into digital signals which are then passed to a processor 44 connected to the analogue digital converter 42.

The processor 44 is arranged to amplify signals output by the analogue digital converter 42 prior to storage within the data store 52. The processor 44 is also arranged to determine from data within the temporary data store 52 and signals received and amplified from the analogue digital converter 42, whether a structurally significant event has occurred. As will be described in detail later when such an event has been determined to have occurred data indicative of the event and the time at which it occurred are stored in the memory 46.

The data store 52 in this embodiment is arranged to store data used by the processor to determine if a significant structural event has occurred. As such the data store 52 is arranged to store data for short periods of time whilst the significance of the data may be assessed. The memory 46 in contrast is a long term data store which is intended to provide a permanent record of significant structural events experienced by the structure to which the stress monitoring device is attached. The memory 46 in this embodiment comprises a flash RAM which enables data to be read out from the memory 46 without interfering with the processing of the memory 46.

The transmitter/receiver 54 is arranged to receive radio messages front a data reader 4. When this occurs the transmitter/receiver 54 passes a signal to the processor 44 which then causes the processor 44 to retrieve data from the memory 46 which is then transmitted as a radio signal by the transmitter receiver 54 to the data reader 4. Thus in this way the contents of the memory 46 may be copied into the memory of a data reader 4 for subsequent analysis.

The processing of signals by the processor 44 on a processing unit 30 in accordance with this embodiment of the present invention will now be described with reference to FIG. 5.

Figure 5:
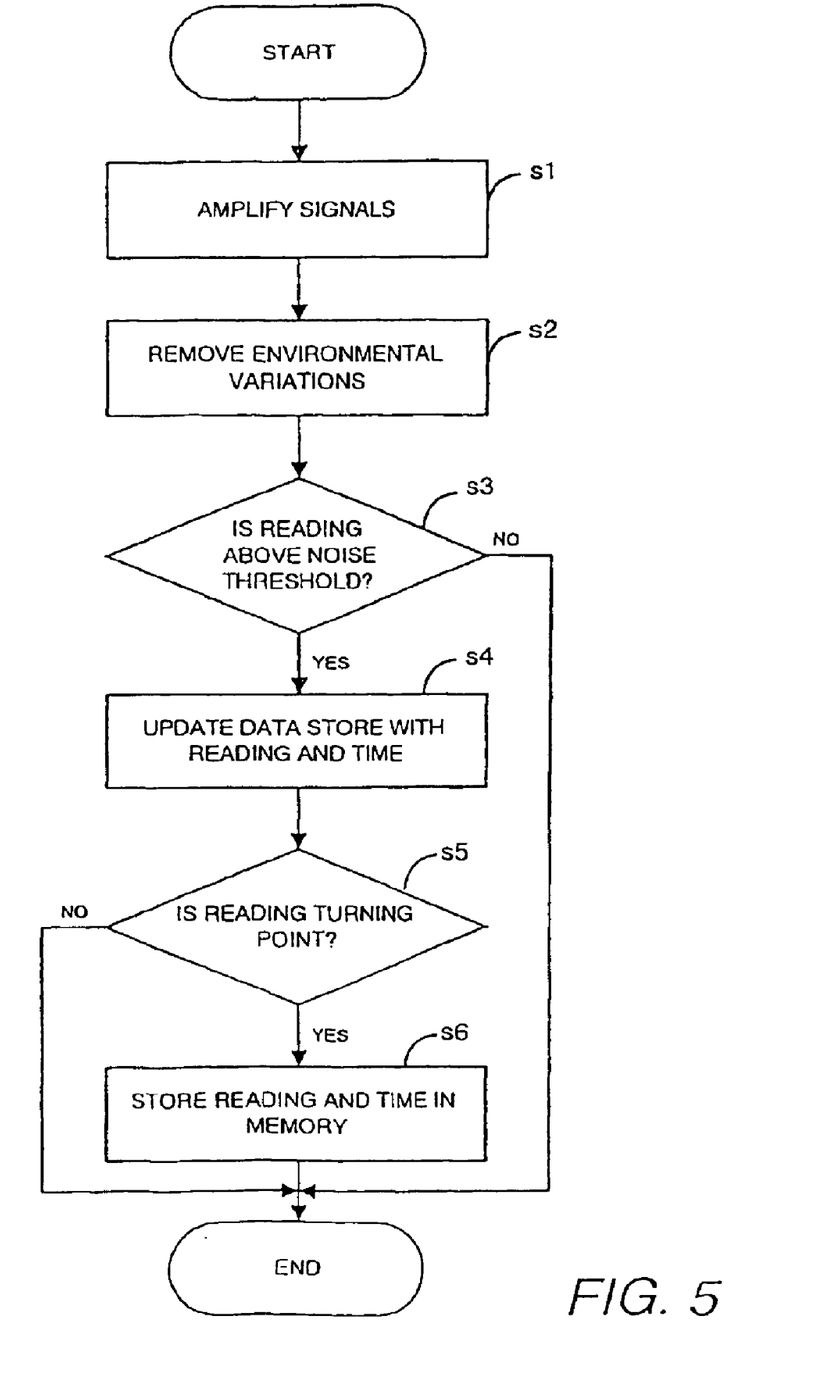
FIG. 5 is a flow diagram of the processing of the processor of FIG. 4.

FIG. 5 is a flow diagram of the processing of a processor 44 in accordance with this embodiment of the present invention. Periodically for example every 1.5 milliseconds the processor 44 processes signals obtained from the analogue digital converter 42. The signals from the analogue digital converter 42 in this embodiment of the present invention comprise four signals, three signals from the first strain sensor corresponding to strain readings in three directions from the strain sensor 22 and one signal corresponding to one reading from the second strain sensor 24. When the processor 44 obtains these four signals from the analogue/digital converter 42, the processor 44 initially (s1) digitally amplifies these signals by a factor of 5,000.

The processor 44 then (s2) subtracts from the amplified signals for the three directions for which readings from a first strain sensor 22 have been obtained, the reading obtained by the second strain sensor 24.

Since only the first strain sensor 22 is bonded to the surface of the drill string 2 only the first strain sensor 22 is effected by stresses and strains exerted upon the drill string 2. Any variation in the reading from the second strain sensor 24 therefore only arise due to environmental factors such as variations in temperature to which the stress monitoring device 1 is subjected. Thus by subtracting the readings from the second strain sensor 24 from the readings of the first strain sensor 22 a set of three values for the stresses exerted upon the drill string 2 in three different directions is obtained which is not influenced by the environmental factors.

After the readings for the first strain sensor 22 have been modified by subtracting corresponding readings from the second strain sensor 24 the processor 44 then (s3) determines whether for each of the three readings the difference between each reading and a corresponding previously stored reading within the data store 52 exceeds a noise threshold. If the readings of the strain sensor 22 modified to account for environment factors are all substantially identical to the values previously stored in the data store 52, this indicates that the stresses exerted upon the drill string 2 have not varied significantly from the previous time a determination of stress has been made. By filtering the readings of the strain sensor in this way minor errors arising due to, for example, vibration in the wires 32,34 are not recorded as events effecting the drill string 2.

If all of the readings from the first strain sensor do substantially correspond to those previously stored in the data store 52 no further action is then taken by the processor 44 until the next signal is received from the analogue digital converter 42.

If, however, the readings from the strain sensor 22 do vary by an amount greater than the threshold amount the new set of readings are then (s4) stored within the data store 52, together with data indicating the time indicated by the clock 50 for the time at which the processor 44 obtained the readings from the strain sensor 22 overwriting values corresponding to the reading stored within the data store 52 previous to the reading before the last reading. Thus in this way the data store 52 has stored therein three sets of readings from the first strain sensor 22 amplified and modified to account for environmental factors for three consecutive readings which differ from one another by an amount greater than a noise threshold value, each of the three sets of readings comprising three values indicating strain in three different directions within the drill string 2.

The processor 44 then. (s5) determines whether the data stored within the data store 52 indicates that the strain exerted upon the drill string 2 has reached either a maxima or a minima (s5). This is achieved by the processor 44 determining for each of the values corresponding to measurements of stress in a particular direction whether the value corresponding to the middle of the three readings stored within the data store 52 for a particular direction is greater than or less than both of the other two readings for stress in that direction. If this is the case the processor 44 then (s6) stores the data corresponding to the middle reading comprising the three values for the stresses detected in the three directions by the first strain sensor 22 and time data corresponding the time on the clock 50 at which the values were measured in the memory 46. The processing of the processor 44 then ends until the next signal received by the processor 44 from the analogue digital converter is processed.

Thus in this way data indicating the strain exerted upon a drill string 2 indicating maximum compression or extension is recorded within the memory 46 together with the time at which such expansion and compression occurred. When this data is read out using a data reader 4 the data may then be processed in a conventional manner by rain flow or range pair analysis to identify loading sequences experienced by the drill string 2 from which the fatigue experienced by the drill string 2 may be determined. When the fatigue calculated from the readings has exceeded a threshold value the drill string 2 may be withdrawn from use to ensure that down hole failure does not occur as a result of structural failure of the drill string 2.

A second embodiment of the present invention will now be described with reference to FIG. 6. In the first embodiment of the present invention a stress monitoring device was described which is arranged to record maximum and minimum stresses exerted upon a device to which the monitoring device 1 was connected. In this embodiment of the present invention, in addition to recording significant structural events comprising periods of maximum and minimum stress, the monitoring device 1 in accordance with this embodiment is arranged also to record data indicating rest periods when no external structural stress is applied to the device to which it is attached.

The stress monitoring device 1 in this embodiment of the present invention is identical to that described in relation to the first embodiment except the processor 44 is arranged to process data received from the analogue digital convertor 42 in a manner which will now be described with reference to FIG. 6.

Figure 6:
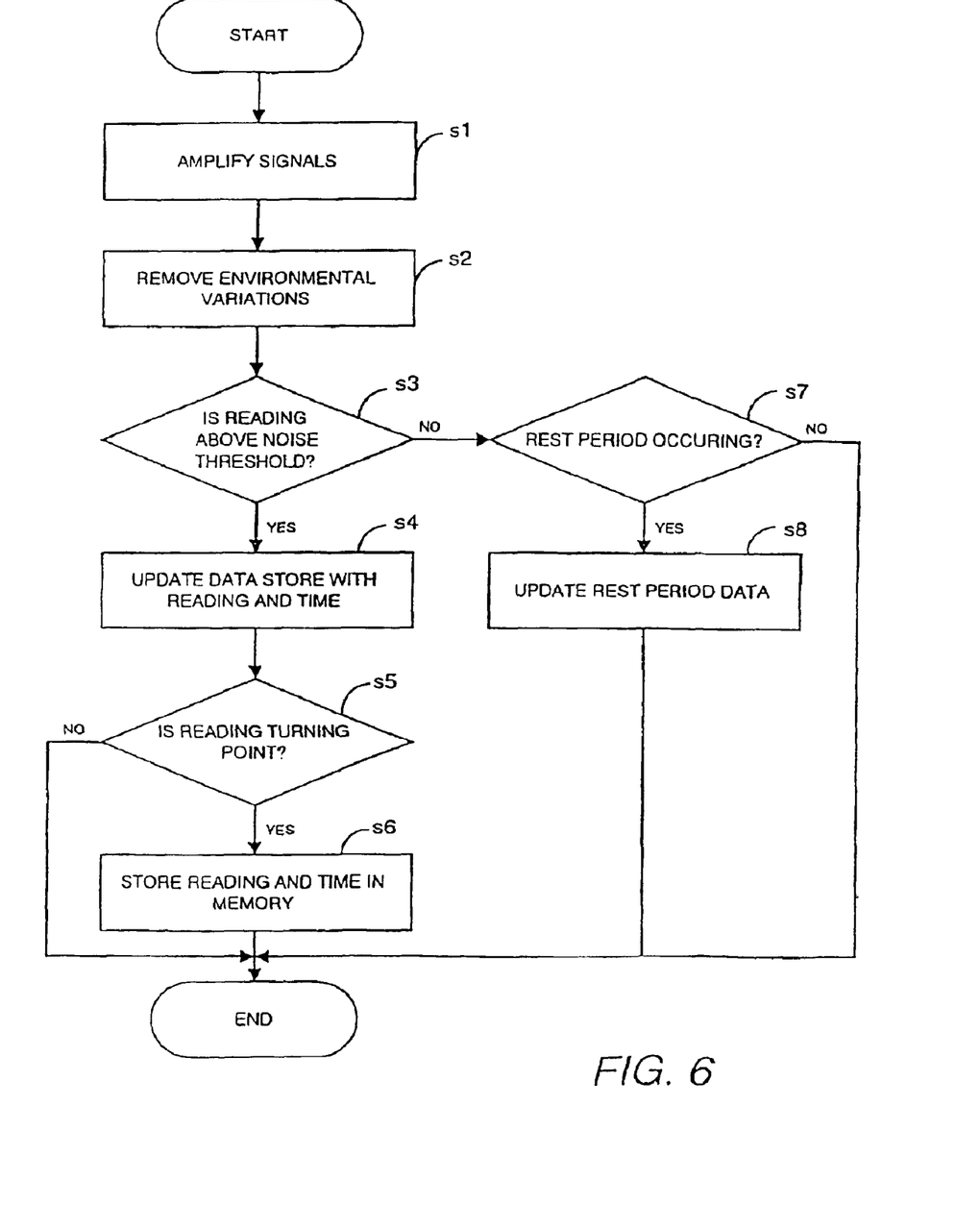
FIG. 6 is a flow diagram of the processing of a processor in accordance with a second embodiment of the present invention.

FIG. 6 is a flow diagram of the processor 44 in accordance with the second embodiment of the present invention. The processing of the processor 44 in accordance with this embodiment of the present invention is identical to that which has been described in relation to the first embodiment which will not be repeated here except when (s3) the processor determines that the readings from the first strain sensor 22 modified by subtracting corresponding readings from the second strain sensor 24 are determined to substantially correspond to corresponding readings stored within the data store 52.

In this embodiment, when this occurs, the processor 44 then (s7) determines (s7) whether a rest period is occurring by comparing the current time on the clock 50 with the time associated with the last recorded measurement of strain recorded within the memory 46. If the time difference between the reading on the clock 50 and the reading last recorded within the memory 46 is above a predetermined threshold this indicates that no variation in structural stress within the device to which the stress monitoring device 1 is attached has occurred for a period of time greater than this preset threshold, data indicating the length of the rest period is then stored (s8) within the data store 52.

After either data has been stored in the data store 52 (s8) or after the processor 44 has determined that no rest period is occurring 57 the processing of the processor 44 then comes to an end.

When a variation in stress determined to correspond to a turning point (s5) is detected the processor 44 stores data corresponding to this reading and data identifying the length of time of the previous rest period recorded within the data store 52 within memory. The rest period data within the data store 52 is then set to zero.

Thus in this way in addition to having stored within the memory 46 data identifying the maximum and minimum stresses exerted upon the device to which the stress monitoring device one is connected the memory 46 also has stored therein data identifying the time periods and times of occurrence of periods in which no variation in stress occurs. This data may then be read out of the memory 46 in the same manner in which has been described in relation to the first embodiment.

A third embodiment of the present invention will now be described. In the previous two embodiments of the present invention a stress monitoring device 1 has been described which is arranged to record data indicating maximum and minimum stresses exerted upon a device or component to which the stress monitoring device 1 is attached. Although providing a useful record of the stresses exerted upon the device or component, for some applications, particularly where stress frequently varies or where stress is to be monitored over a long period of time, problems may arise with the need to store large amounts of data.

Thus in accordance with this embodiment of the present invention, in addition to processing and recording data as has been described in the first embodiment, in this embodiment, periodically the data stored within the memory 46 of the stress monitoring device 1 is itself processed with the results of the processing being stored whilst the actual data obtained by the stress monitoring device 1 in the memory 46 is then allowed to be overwritten The applicants for the present invention have appreciated that for long term structural monitoring of devices and components, changes within the components and devices arising from fatigue give rise to variations in the way in which a component or device reacts to applied loads. In particular, long term variations in the manner in which part of a device or component is stressed may be indicative of the generation of cracks in a portion of the device or component remote from where stress is being measured.

Thus in accordance with this embodiment of the present invention after a pre-set period of measurements have been stored within the memory 46 the processor 44 in accordance with this embodiment determines an average ratio of the readings for the three directions in which stress is monitored by the way rosette strain sensor 22. These calculated ratios are then stored within the memory 46. The processor 44 then proceeds to overwrite the previously recorded measurements of maximum and minimum strain stored within the memory 46 for a corresponding pre-set time period and then further ratio data is recorded. This cycle is repeated with ratio data accumulating within the memory 46. When data is read out of the memory 46 the manner in which the ratio of strain in the three directions measured by the strain sensor 22 varies over time may then be determined so that the generation of faults and cracks within the device or component to which the stress monitoring device 1 is attached may be calculated.

Although in the above described embodiment apparatus has been described in which ratios of different average ratios of stress measured in three directions has been described as being recorded for each time period for which maximum and minimum stress readings are stored. It will be appreciated that the memory requirements for storing data could be further reduced by only storing data within the memory 46 for average ratios for time periods where the average ratio differs from a pre-set threshold from the ratio for the previous time period. Thus in this way less data would need to be stored within the memory 46 whilst trends in the manner in which a component or device being monitored reacts to applied stress could be determined.

Although in this embodiment reference has been made to processing readings of stress to obtain data identifying ratios of average stress experienced in different directions, it would be appreciated that data could also be generated identifying the manner in which magnitude of detected stresses varied over time to provide a record of the manner in which the component or device to which the recorded stress monitoring device 1 is attached differs in its reactions to applied load.

Figure 7:
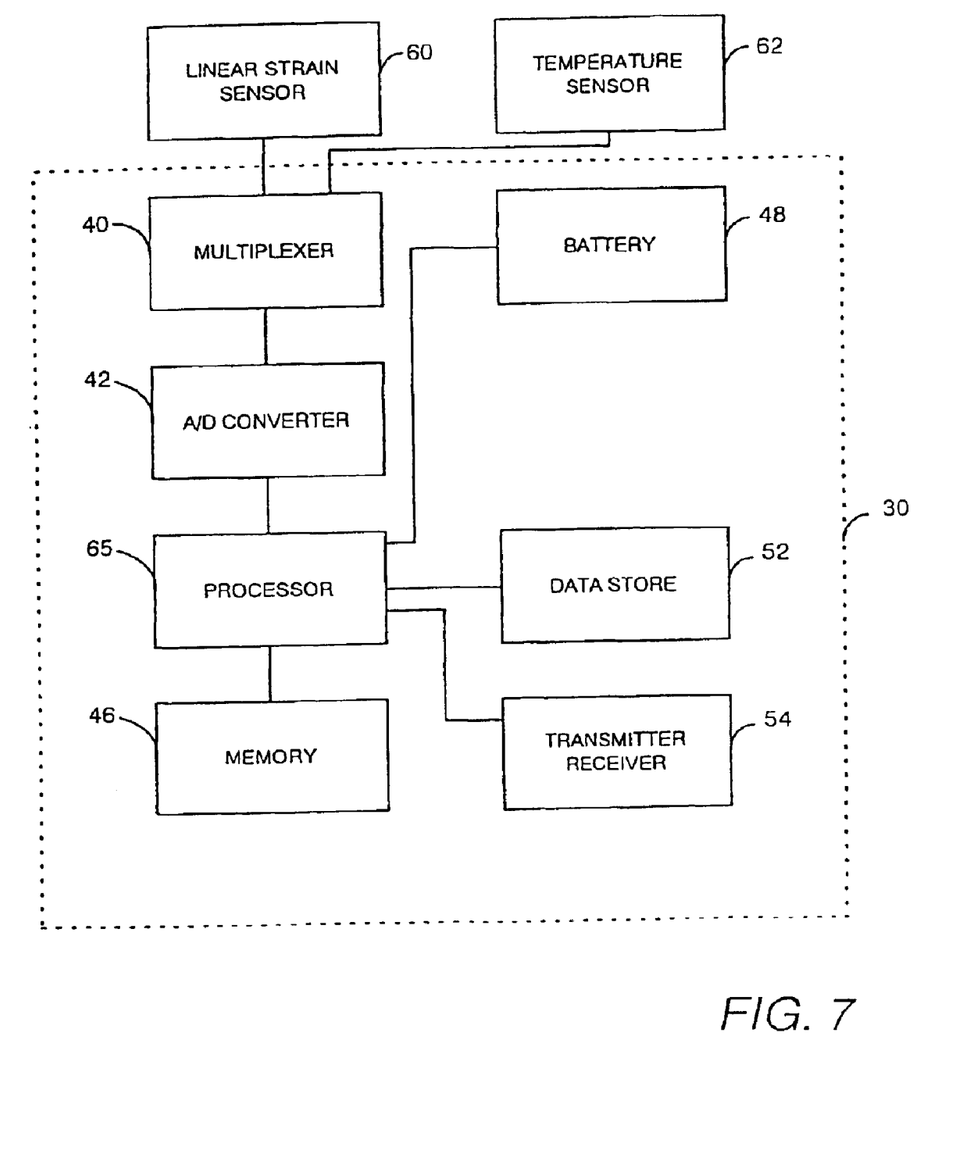
FIG. 7 is a block diagram of the processing unit of a fourth embodiment of the present invention.

A fourth embodiment of the present invention will now be described with reference to FIGS. 7 and 8. FIG. 7 is a block diagram of a processing unit 30 in accordance with this embodiment. This embodiment of the present invention is identical to that described in relation to the first embodiment except that instead of the processing unit 30 being connected to a first 22 and second strain sensor where the first 22 and second 24 strain sensors are both rosette strain sensors, in this embodiment the processing unit 30 is connected to a linear strain sensor 60 and to a temperature sensor 62. The processing unit 30 in accordance with this embodiment is also modified in that no clock is provided and the processor 44 is replaced by an alternative processor 65 arranged to utilise the signals from the linear strain sensor 60 and temperature sensor 62.

In this embodiment, a stress monitoring unit is provided to monitor stress experienced by a component or structure in a single direction. By providing a linear strain sensor 60 arranged to measure strain in a single direction the processing requirements of the processing unit 30 can be reduced since only one measurement of stain is processed.

Figure 8:
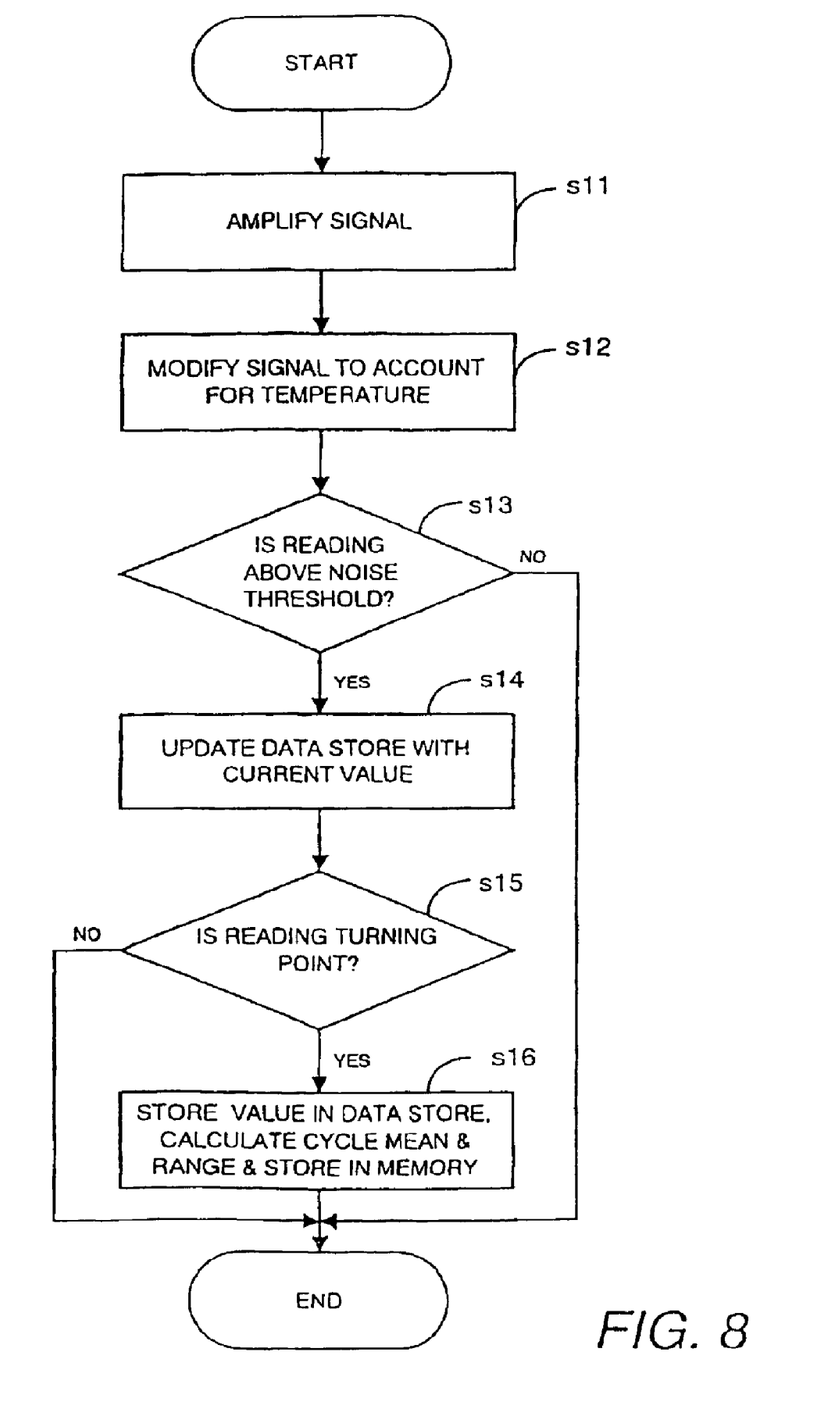
FIG. 8 is a flow diagram of the processing of the processor of FIG. 7.

FIG. 8 is a flow diagram of the processing of the processor 65 in accordance with this embodiment of the present invention. As in relation to the first embodiment signals received from the strain sensor 60 and the temperature sensor 62 by the multiplexor 40 are passed to the analogue digital convertor 42 before being output to the processor 65. The signal from the linear strain sensor 60 is then (s11) amplified by the processor 65 in a similar way to that described in relation to the first embodiment. The processor 65 then (s12) modifies the amplified signal to account for variations in temperature as indicated by the temperature sensor 62.

The modified signal is then (s13) compared with data stored with the data store 52. In this embodiment to the present invention the data store is arranged only to store data corresponding to three previous readings obtained from the linear strain sensor 60 amplified and modified by the processor 65 and a value for the latest turning point value stored in the memory 46. When comparing the latest reading with those stored in the data store the processor 65 initially determines whether the present reading obtained by the linear strain sensor 60 varies from the latest reading stored within the data store 52 by an amount greater than the noise threshold value. If this is the case the processor 65 overwrites (s14) the reading stored before the last but one reading stored within the data store 52.

The processor 65 then determines whether a turning point has been reached (s15) this is calculated by determining whether the middle of three readings stored within the data store 52 is greater than or less than both of the other two readings. If this is the case this middle reading is then compared with the previous turning point value stored within the data store 52 and a cycle mean and range corresponding to the difference between the middle value and the turning point value stored within the data store 52 and the average value between the middle value and the turning point value stored within the data store 52 respectively are calculated and stored (s16) within the memory 46. The middle value of the data store 52 is then used to overwrite the value for the latest turning point stored within the data store 52. The processing of the processor 65 then comes to an end until the next signal is received from the analogue digital convertor 42.

In contrast to the previous embodiment of the present invention, this embodiment only records within the memory 64 data indicative of the mean and range of cyclic compression and extension as measured by the linear strain sensor 60. The amount of data stored within the processing unit 30 can therefore be reduced. Furthermore since in this embodiment the processing unit 30 does not need to power a clock the lifetime of the unit as dictated by the battery 48 is increased.

Figure 9:
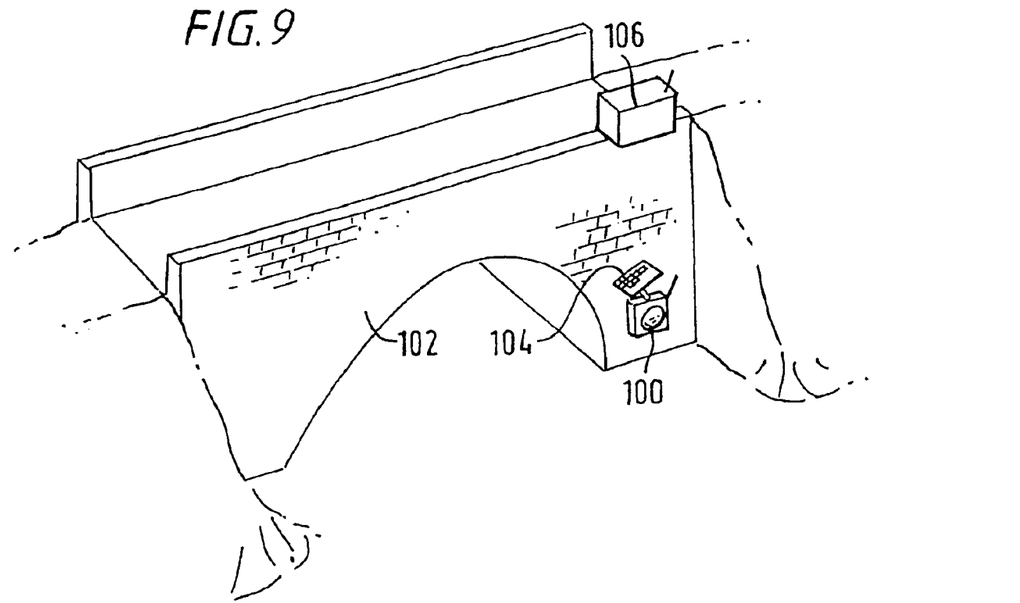
FIG. 9 is a perspective view of a fifth embodiment of the present invention arranged to measure stresses exerted upon a bridge.

A fifth embodiment of the present invention will now be described. FIG. 9 is a schematic diagram of a fifth embodiment of the present invention. This embodiment of the present invention comprises a stress monitoring unit 100 arranged for attachment to a bridge 102. The stress monitoring unit 100 in accordance with this embodiment in the present invention is connected to and powered by a solar cell 104. The stress monitoring unit 100 is arranged to monitor stresses exerted upon the bridge 102 and periodically transmit by means of a radio signal, its readings to a data logger 106 provided on easily accessible portion of the bridge. The data logger 106 provides a back-up storage device for storing the data generated by the stress monitoring unit 100. When the bridge is inspected data from within the data logger 106 can be downloaded into a portable computer (not shown in FIG. 9).

Thus in this way stresses exerted upon a bridge 102 may be measured easily. In particular stresses exerted on portions of a bridge 102 which are not easily accessible may be easily measured. The provision of solar cell 104 enables the stress monitoring unit 100 to be self powered and thereby enables the stress monitoring unit 100 to have a lifetime of approximately the same duration as the expected lifetime of the bridge 102 on to which it is attached. The stress monitoring unit 100 therefore is able to record stresses exerted upon the bridge 102 throughout the entire lifetime of the bridge 102.

Figure 10:
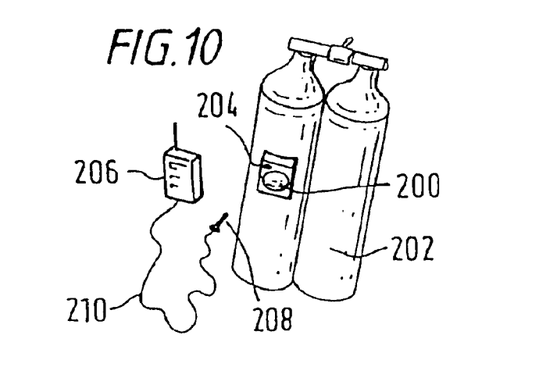
FIG. 10 is a perspective view of a sixth embodiment of the present invention arranged to measure stresses exerted upon diving equipment.

FIG. 10 is a schematic prospective view of a sixth embodiment of the present invention. In this embodiment of the present invention a stress monitoring unit 200 is provided that is attached to an aqua lung 202. The stress monitoring unit 202 monitors the stresses exerted upon the aqua lung 202.

In this embodiment of the present invention, the stress monitoring unit 200 is provided with a data port 204 to which a data layer 206 may be connected via an interface 208 and an interface lead 210. When the interface 208 of the data logger 206 is inserted into the data port 204 this causes data within the memory of the stress monitoring unit 200 to be copied into the memory of the data logger 206. As in this embodiment of the present invention a direct communications link between the stress monitoring unit 200 is provided by the interface 201 and interface lead 210, no transmitter/receiver is required within the stress monitoring unit 200. Furthermore, the power required to copy data into the memory of the data logger 206 maybe provided by the data logger 206 itself rather than by the stress monitoring unit 200 thereby extending the battery life of the stress monitoring unit 200.

In this embodiment of the present invention as the stresses exerted when diving in general vary very little other than when a charge in depth is occurring the stress monitoring unit 200 in this embodiment is arranged to periodically determine stresses within the aqua lung 202 every two seconds. Thus in this way the amount of data generated and the power required by the stress monitoring unit 200 are minimised.

In general it will be appreciated that the frequency of obtaining measurements of stress exerted upon a structure may be selected so as to be appropriate for the structure which is being monitored. Thus for structures such as a rotating drill string which are rotated at relatively high speed and therefore are subject to frequent large variations in stress a higher frequency of measurement will be used relative to an application where stress is substantially constant and varies infrequently over time.

Although in the previous embodiments reference has been made to electrical strain gauges arranged to measure strain on the basis of variation in resistance, it will be appreciated that other types of strain gauge could be used. In particular, the present invention could be applied to strain gauges measuring variation in stress and strain utilizing optical fibres.

Although in the previous embodiments reference has been made to stress monitoring units which store data and then either periodically transmit copies of the stored data for analysis or transmit data upon request, it will be appreciated that a stress monitoring unit could be provided that was arranged to transmit data continually whilst stress was being monitored.

In the previous embodiments data stored within the memory of a stress monitoring unit has been described in terms of data indicative of maxima and minima of exerted stress, or times and duration of rest periods it will be appreciated that in general any suitable algorithm could be provided for selecting those readings obtained by a stress monitoring unit which are stored within the memory of the stress monitoring unit as a long term record of the stresses experienced by a structural component to which the unit is attached.

Furthermore, it will be appreciated that such recorded readings could as has been described in relation to the third embodiment be further periodically processed to generate data identifying trends in the manner in which a component or device reacts to applied stresses.

In some embodiments of the present invention, the data store 52 could be arranged to store, for each of the directions in which strain sensors 22,24 detect strain, values from zero to 255 indicative of the relative reading for strain in each direction relative to stored offsets. In this way, by storing only the values and the offsets, readings of strain could be stored utilizing relatively little memory.

In some embodiments of the present invention, an input interface could be provided to enable the input of data identifying the material of the structure being monitored. This data could then be utilized by the processor 44 to alter the threshold used to filter out variations in stress and strain which amount to variations beneath the threshold which will effect the structure integrity of a structure of that material in any way. Thus in this way, the monitoring device may be suitable for monitoring structures of different materials.

Although in previous embodiments reference has been made to data being transmitted to a reader or data logger by means of a radio link, it will be appreciated that any suitable transmission means could be used. Thus for example electromagnetic proximity sensors or infrared transmission could be used. Alternatively where a direct link is provided between a stress monitoring device and a data logger either an electrical signal or a light signal sent via a fibre optical cable could be used to transmit data stored within the memory of the stress monitoring unit.

In the previous embodiments reference has been made to an apparatus in which a stress monitoring unit is provided that is separate from a computer for analysing recorded measurements of stress and strain. It will be appreciated that means for analysing data could be provided as part of the stress monitoring device itself thus for example graphical or numerical outputs of recorded stress indicating for example the magnitude and number of compressions and expansions experienced by a structure could be calculated from the recorded measurements of stress and displayed on a liquid crystal display incorporated as part of the stress monitoring device. Alternatively, a warning device such as an alarm in the form of a flashing light could be provided as part of the stress monitoring unit, with the unit arranged to indicate when a predetermined amount of fatigue has been experienced by a structure.

Although in the above described embodiments, strain sensors 22,24 have been described arranged to detect variations in stress where both strain sensors 22,24 are provided within the same hole 11 of a plate 10, it will be appreciated that the sensor 24 detecting stress in a foil 25 could be provided within the cavity 20 defined by the housing 16. Alternatively, each sensor could be provided in a separate hole that did not communicate with the hole containing the other sensor.

What is claimed is:

1. Apparatus for detecting stresses experienced by a structure, comprising:

a housing adapted to be attached to a structure;

a strain gauge positioned within said housing such that when said housing is attached to a structure the strain gauge may detect stresses experienced by the structure, the strain gauge being operable to generate electrical signals indicative of said stresses;

a memory within said housing and operable to record data derived from said signals to form a record of stresses experienced at different points in a period of time by the structure to which said housing is attached; and a temperature variation detector within said housing operable to identify variations in detected stress by said strain gauge arising from variations in temperature, wherein said memory is responsive to record data identifying stresses experienced by said structure arising from variations in load on said structure independent of identified variations arising from variations in temperature.

2. Apparatus in accordance with claim 1 further comprising a processor within said housing operable to determine which variations indicative of changes in stress arising from variation in load are at least a predetermined threshold, wherein said memory is responsive to said determination to record data derived from signals identified by said processor as being indicative of stresses arising from variations in load of at least said predetermined threshold.

3. Apparatus in accordance with claim 1 further comprising a processor within said housing operable to determine which variations indicative of changes in stress arising from variation in load are indicative of the occurrence of maximal or minimal loads, said memory being responsive to said processor to record data derived from signals indicative of maximal or minimal loads.

4. Apparatus in accordance with claim 1 including a processor within said housing operable to determine which variations indicative of changes in stress arising independent of variations arising from variations in temperature are indicative of the occurrence of a period of substantially constant load, said memory being responsive to said processor to record data derived from signals indicative of periods of substantially constant load.

5. Apparatus in accordance with claim 1, including a processor within said housing operable to detect characteristics of said signals indicative of the occurrence in said structure of one or more predetermined stress conditions arising from variations in load on said structure independent of identified variations arising from variations in temperature, said memory being operable in response to detection of said characteristics by said processor to record data indicative of the occurrence of said predetermined stress conditions.

6. Apparatus in accordance with claim 5, wherein said processor is operable to cause said memory to record data derived only from signals determined by said processor to possess said characteristics indicative of said one or more predetermined stress conditions.

7. Apparatus in accordance with claim 1 further comprising a clock within said housing wherein said memory is arranged to include in said record, data identifying the different points in a period of time at which signals are generated from which recorded data in said record is derived.

8. Apparatus in accordance with claim 1 wherein said memory is arranged to generate a record identifying stresses experienced by the structure to which said housing is attached arising from variations in load on said structure independent of identified variations arising from variations in temperature derived from electrical signals generated by said strain gauge obtained at different points in time each separated by a predefined time period.

9. Apparatus in accordance with claim 1 wherein said temperature variation detector comprises:
   a temperature sensor operable to generate signals indicative of a detected temperature;
   a processor operable to process electrical signals generated by said strain gauge and signals generated by said temperature sensor to calculate a signal indicative of stresses experienced by said structure arising from variations in load on said structure independent of identified variations arising from variations in temperature.

10. Apparatus in accordance with claim 1 wherein said temperature variation detector comprises:
    a second strain gauge positioned within said housing attached to a non-load bearing sample of material of the structure said housing is operable to be attached, said second strain gauge thereby being operable to generate electrical signals indicative of stresses experienced by said structure arising from variations in temperature independent of variations arising from variation in load on said structure; and
    a processor operable to process electrical signals generated by said second strain gauge and electrical signals indicative of detected stresses experienced by the structure to which said housing is attached to calculate a signal indicative of stresses experienced by said structure arising from variations in load on said structure independent of identified variations arising from variations in temperature.

11. Apparatus for detecting stresses experienced by a structure arising from variations in load, comprising:
    a housing adapted to be attached to a structure;
    a strain gauge positioned within said housing such that when said housing is attached to a structure the strain gauge may detect stresses experienced by the structure, the strain gauge being operable to generate electrical signals indicative of said stresses;
    detection means provided within said housing for determining variations in stress detected by said strain gauge arising from variations in temperature;
    recording means within said housing responsive to said strain gauge and said detection means to generate a record identifying stresses experienced by said structure arising from variations in load on said structure independent of identified variations arising from variations in temperature; and
    output means operable to output data representing said record.

12. A method of obtaining a history of stresses experienced by a structure arising from variations in load on said structure independent of identified variations arising from variations in temperature; the method comprising
    providing an apparatus for detecting stresses experienced by a structure, comprising:
    a housing adapted to be attached to a structure;
    a strain gauge positioned within said housing such that when said housing is attached to a structure the strain gauge may detect stresses experienced by the structure, the strain gauge being operable to generate electrical signals indicative of said stresses;
    a memory within said housing and operable to record data derived from said signals to form a record of stresses experienced at different points in a period of time by the structure to which said housing is attached; and
    a temperature variation detector within said housing operable to identify variations in detected stress by said strain gauge arising from variations in temperature,
    wherein said memory is responsive to record data identifying stresses experienced by said structure arising from variations in load on said structure independent of identified variations arising from variations in temperature;
    attaching said apparatus to said structure;
    utilizing said apparatus to generate a record of stresses experienced at different points in a period of time by said structure arising from variations in load on said structure, independent of identified variations arising from variations in temperature; and
    outputting data corresponding to the generated record.

* * * * *